US009882689B2

(12) United States Patent
Yu et al.

(10) Patent No.: US 9,882,689 B2
(45) Date of Patent: Jan. 30, 2018

(54) APPARATUS AND METHOD FOR BASE STATION COOPERATIVE COMMUNICATION IN WIRELESS COMMUNICATION SYSTEM

(71) Applicant: Samsung Electronics Co. Ltd., Suwon-si, Gyeonggi-do (KR)

(72) Inventors: Hyun-Kyu Yu, Yongin-si (KR); Jeong-Ho Park, Seoul (KR); Su-Ryong Jeong, Yongin-si (KR); Bo-Hyun Kang, Seoul (KR); Cheol Jeong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 685 days.

(21) Appl. No.: 14/056,357

(22) Filed: Oct. 17, 2013

(65) Prior Publication Data
US 2014/0112269 A1   Apr. 24, 2014

(30) Foreign Application Priority Data
Oct. 18, 2012   (KR) .......................... 10-2012-0115849

(51) Int. Cl.
| H04W 4/00 | (2009.01) |
| H04L 5/00 | (2006.01) |
| H04W 24/02 | (2009.01) |
| H04B 7/024 | (2017.01) |
| H04B 7/06 | (2006.01) |

(52) U.S. Cl.
CPC ........... *H04L 5/0035* (2013.01); *H04B 7/024* (2013.01); *H04W 24/02* (2013.01); *H04B 7/0617* (2013.01)

(58) Field of Classification Search
CPC ...................................................... H04W 28/04
USPC .......................................................... 370/329
See application file for complete search history.

(56) References Cited

U.S. PATENT DOCUMENTS

| 8,401,480 | B2 | 3/2013 | Koo et al. |
| 2009/0252109 | A1 | 10/2009 | Kim et al. |
| 2010/0075705 | A1 | 3/2010 | Van Rensburg et al. |
| 2010/0284351 | A1 | 11/2010 | Liang et al. |
| 2010/0304682 | A1 | 12/2010 | Choi et al. |
| 2011/0182375 | A1 | 7/2011 | Kim et al. |

(Continued)

FOREIGN PATENT DOCUMENTS

| CN | 102064871 A | 5/2011 |
| EP | 2 357 767 A1 | 8/2011 |

(Continued)

*Primary Examiner* — Samina Choudhry
(74) *Attorney, Agent, or Firm* — Jefferson IP Law, LLP

(57) ABSTRACT

A Base Station (BS) cooperative communication method in a wireless communication system is provided. The BS cooperative communication method includes measuring signal quality of one or more neighboring BSs, comparing a number of downlink beams available for communication between a serving BS and a Mobile Station (MS) with a reference value, determining not to involve the one or more neighboring BSs in BS cooperative communication for the MS when the number of downlink beams is equal to or larger than the reference value, comparing signal measurements of the one or more neighboring BSs with a first threshold when the number of downlink beams is smaller than the reference value, and determining to involve one or more neighboring BSs having a signal measurement value larger than the first threshold in the BS cooperative communication for the MS.

30 Claims, 7 Drawing Sheets

(56) References Cited

U.S. PATENT DOCUMENTS

| | | |
|---|---|---|
| 2011/0207494 A1 | 8/2011 | Zhu et al. |
| 2012/0189077 A1 | 7/2012 | Seo et al. |
| 2012/0207055 A1 | 8/2012 | Kang et al. |
| 2012/0282966 A1 | 11/2012 | Koo et al. |

FOREIGN PATENT DOCUMENTS

| | | |
|---|---|---|
| KR | 10-2007-0066871 A | 6/2007 |
| KR | 10-2010-0100571 A | 9/2010 |
| KR | 10-2010-0100572 A | 9/2010 |
| KR | 10-2011-0044937 A | 5/2011 |
| KR | 10-2011-0086337 A | 7/2011 |
| KR | 10-2012-0112370 A | 10/2012 |
| WO | 2011/115703 A1 | 9/2011 |

APPARATUS AND METHOD FOR BASE STATION COOPERATIVE COMMUNICATION IN WIRELESS COMMUNICATION SYSTEM

CROSS-REFERENCE TO RELATED APPLICATION(S)

This application claims the benefit under 35 U.S.C. § 119(a) of a Korean patent application filed on Oct. 18, 2012 in the Korean Intellectual Property Office and assigned Serial No. 10-2012-0115849, the entire disclosure of which is hereby incorporated by reference.

TECHNICAL FIELD

The present disclosure relates to a wireless communication system. More particularly to, the present disclosure relates to a method and an apparatus for performing base station cooperative communication by a user equipment in a base station cooperative communication system.

BACKGROUND

A wireless communication system has been rapidly developed. Particularly, as a result of various demands of users, a system supporting a high speed and large capacity data service is necessary. In order to meet traffic demands of wireless data, which has continuously increased, wireless communication systems supporting a higher data transmission rate have been developed. A next generation wireless communication system seeks to develop a technology that mainly improves a spectral efficiency to increase a data transmission rate. However, meeting the traffic demands of wireless data that have increased heavily through improvement of the spectral efficiency alone is difficult.

One of methods to solve the above identified problems uses a very wide frequency band. A frequency band used in a mobile communication cellular system according to the related art generally corresponds to 10 GHz or lower, thereby having a difficulty in securing the wide frequency band. Accordingly, securing a broadband frequency in a higher frequency band is required. In order to secure the wide frequency band such as a super high frequency, a millimeter (mm) wave system may be introduced. The millimeter wave system considers a beamforming technology in order to mitigate a propagation path loss according to a frequency characteristic and increase a delivery distance of a radio wave transmission distance.

However, efficiently supporting a large capacity service of the user located in a cell boundary area and guaranteeing a stable link by a channel characteristic of the millimeter wave band using solely beamforming technology is difficult. For example, when only one communication link (Tx-Rx beam pair) exists, a situation in which communication is disconnected by unexpected obstacles may occur. As a technology to solve the above problems, a communication system that provides a service to one Mobile Station (MS) through cooperation between a plurality of Base Stations (BSs). In other words, a communication system that provides a service to one MS using cooperative communication between BSs has been researched.

In forming a cooperative BS group, methods that mainly mitigate interference or increase a received signal to interference plus noise ratio may be considered. However, in the millimeter wave beamforming system, reliability of a link is a very important consideration, and accordingly, a method of forming a BS group taking account of the reliability is needed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for transmitting/receiving information in a communication system.

Another aspect of the present disclosure is to provide a method and an apparatus for supporting cooperative communication between Base Stations (BSs).

Another aspect of the present disclosure is to provide a method and an apparatus for operating a Mobile Station (MS) supporting cooperative communication between BSs.

Another aspect of the present disclosure is to provide an apparatus and a method which configure a BS group in which BSs cooperate with each other to service an MS in a BS cooperative communication system using the beamforming.

Another aspect of the present disclosure is to provide a method and an apparatus in which an MS performs BS cooperative communication in a BS cooperative communication system using the beamforming.

Another aspect of the present disclosure is to provide a method and an apparatus for configuring a BS group to improve all of link reliability and a data rate of a user located at a cell boundary in a BS cooperative communication system using the beamforming.

In accordance with an aspect of the present disclosure, a BS cooperative communication method in a wireless communication system is provided. The BS cooperative communication method includes measuring signal quality of one or more neighboring BSs, comparing a number of downlink beams available for communication between a serving BS and a MS with a reference value, determining not to involve the one or more neighboring BSs in BS cooperative communication for the MS when the number of downlink beams is equal to or larger than the reference value, comparing signal measurements of the one or more neighboring BSs with a first threshold when the number of downlink beams is smaller than the reference value, and determining to involve one or more neighboring BSs having a signal measurement value larger than the first threshold in the BS cooperative communication for the MS.

In accordance with another aspect of the present disclosure, a BS cooperative communication method in a wireless communication system is provided. The BS cooperative communication method includes receiving, by the serving BS, a measurement report indicating signal measurement values of a serving BS and one or more neighboring BSs from a MS, comparing, by the serving BS, a number of downlink beams available for communication between the serving BS and the MS with a reference value, determining not to involve the one or more neighboring BSs in the BS cooperative communication for the MS when the number of downlink beams is equal or larger than the reference value, comparing the signal measurement values of the one or more neighboring BSs with a first threshold when the number of downlink beams is smaller than the reference value, and determining to involve one or more neighboring BSs having a signal measurement value higher than the first threshold in the BS cooperative communication for the MS.

In accordance with another aspect of the present disclosure, an MS apparatus performing BS cooperative communication in a wireless communication system is provided. The MS apparatus includes a measurement unit configured to measure signal quality of a serving BS and one or more neighboring BSs, a controller configured to compare a number of downlink beams available for communication between the serving BS and the MS with a reference value, to determine not to involve the one or more neighboring BSs in the BS cooperative communication for the MS when the number of downlink beams is equal to or larger than the reference value, to compare the signal measurement values of the one or more neighboring BSs with a first threshold when the number of downlink beams is smaller than the reference value, and to determine to involve one or more BSs having a signal measurement value larger than the first threshold in the BS cooperative communication for the MS, and a transmitter configured to transmit a request for changing a member of a BS group for the BS cooperative communication to the serving BS according to a result of the determination.

In accordance with another aspect of the present disclosure, a BS apparatus performing BS cooperative communication in a wireless communication system is provided. The BS apparatus includes a receiver configured to receive a measurement report indicating signal measurement values of a serving BS and one or more neighboring BSs from a MS, a controller configured to compare a number of downlink beams available for communication between the serving BS and the MS with a reference value, to determine not to involve the one or more neighboring BSs in the BS cooperative communication for the MS when the number of downlink beams is equal or larger than the reference value, to compare the signal measurement values of the one or more neighboring BSs with a first threshold when the number of downlink beams is smaller than the reference value, and to determine to involve one or more neighboring BSs having a signal measurement value higher than the first threshold in the BS cooperative communication for the MS, and a transmitter configured to transmit an instruction for the MS to change members of a BS group for the BS cooperative communication according to a result of the determination.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
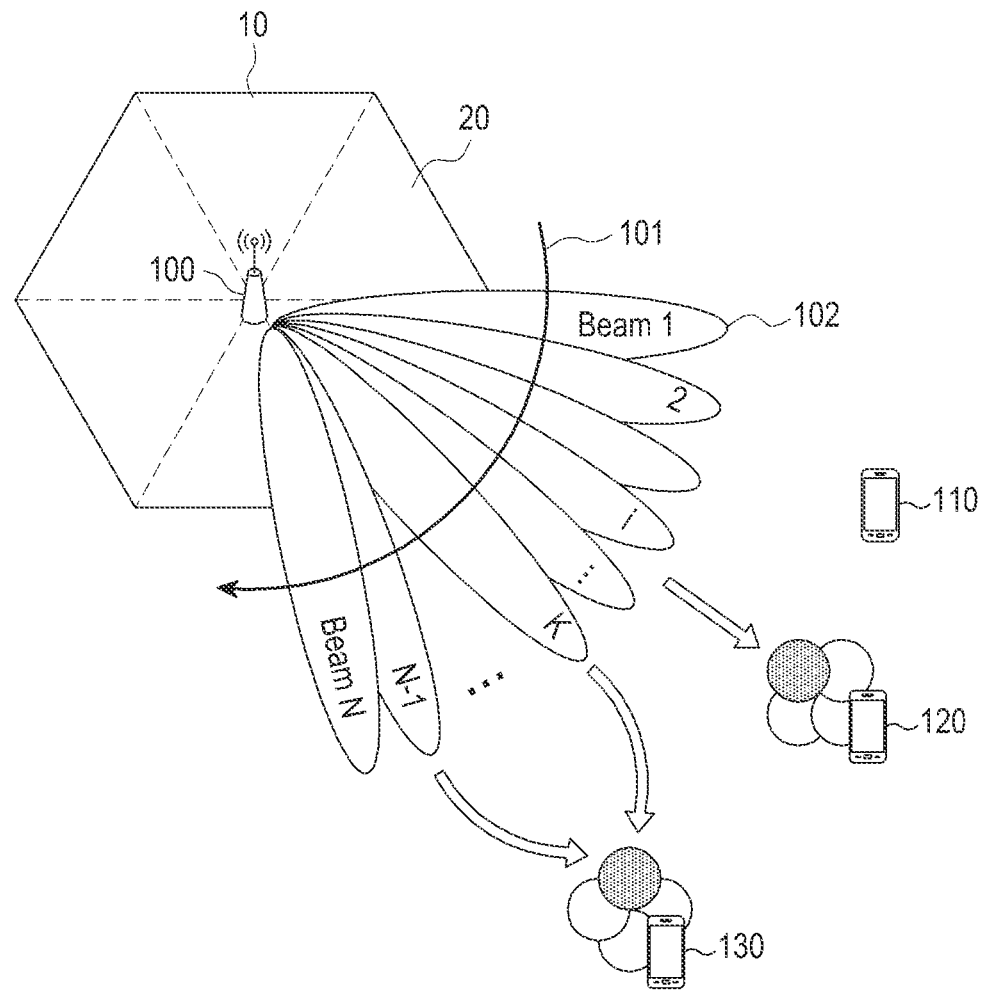
FIG. 1 illustrates an example of a signal transmission/reception scenario based on beamforming according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As a non-exhaustive illustration only, a Mobile Station (MS) described herein may refer to mobile devices such as a cellular phone, a Personal Digital Assistant (PDA), a digital camera, a portable game console, an MP3 player, a Portable/Personal Multimedia Player (PMP), a handheld e-book, a tablet PC, a portable lap-top PC, a Global Positioning System (GPS) navigation, and devices such as a desktop PC, a high definition television (HDTV), an optical disc player, a set-top box, and the like capable of wireless communication or network communication consistent with that disclosed herein.

Hereinafter, a process in which a MS initiates Base Station (BS) cooperative communication in a wireless BS cooperative communication system using the beamforming will be described. In addition, a process in which an MS operating in a BS cooperative communication mode adds a new BS to a BS group for BS cooperative communication will be described.

The beamforming may be divided into the transmission (Tx) beamforming performed by a transmitter and a reception (Rx) beamforming performed by a receiver. In general, the Tx beamforming increases directivity by concentrating a radio wave arrival area at a particular direction by using a plurality of antennas. A form in which the plurality of antennas are arranged may be referred to as an antenna array, and each antenna included in the array may be referred to as an array element. The antenna array may be configured in various types such as a linear array and a planar array. When the Tx beamforming is used, a transmission distance increases through an increase in signal directivity. Further, because the signal is hardly transmitted in another direction other than the directed direction, signal interference for another receiving end significantly decreases. Similarly, the receiver may perform the beamforming for a received signal by using a reception antenna array. The Rx beamforming concentrates reception of radio waves at a particular direction to increase received signal sensitivity incident from the corresponding direction and excludes signals incident from directions other than the corresponding direction from the received signal to provide a gain of blocking an interference signal.

FIG. 1 illustrates an example of a signal transmission/reception scenario based on the beamforming according to an embodiment of the present disclosure.

Referring to FIG. 1, a BS 100 has a service area including one cell 10 and a plurality of sectors 20 pertaining to the cell 10. The number of sectors 20 pertaining to one cell 10 may be one or more. The BS 100 may operate multiple beams for each sector 20 of the cell 10. In order to support one or more MSs while acquiring a beamforming gain, the BS 100 forms one or more Tx beams/Rx beams for a downlink/uplink while simultaneously or sequentially sweeping such beams in different directions. For example, the BS 100 simultaneously forms N beams directing in N directions for N slots. In another example, the BS 100 sequentially forms N beams directing in N directions for N slots while sweeping the beams. Specifically, a first beam 102 may be formed only in a first slot, a second beam may be formed only in a second slot, an $i^{th}$ beam may be formed only in an $i^{th}$ slot, and an $N^{th}$ beam may be formed only in an $N^{th}$ slot.

As a result of structural limitation, MSs 120 and 130 generally operate a wide beam width supporting a smaller beam gain in comparison with the BS 100. According to various embodiments of the present disclosure, the MSs 120 and 130 can support one or more Rx beams/Rx beams for the downlink/uplink.

The BS 100 may simultaneously form a plurality of beamformed signals (e.g., Tx-Rx beams) in different directions or sequentially form one or more Tx-Rx beams directing in different directions while sweeping such beams as indicated by a reference numeral 101.

According to various embodiments of the present disclosure, in order to guarantee a maximum of beamforming gain under a limitation due to a form and complexity, the MSs 110, 120, and 130 may support omnidirectional transmission while not supporting Tx-Rx beamforming, apply only one particular beamforming pattern at a time while supporting the Tx-Rx beamforming, or simultaneously apply a plurality of beamforming patterns in different directions while supporting the Tx-Rx beamforming.

With respect to the MS 110 which does not support the beamforming, the BS 100 measures channel quality of a reference signal for each Tx beam of the MS 110 and selects a beam optimal for the MS 110 from a plurality of beams of the BS 100 based on a result of the measurement. With respect to the MSs 120 and 130 supporting the beamforming, the BS 100 measures channel quality of each of a plurality of beam pairs of the BS 100 for each beamforming pattern of the MSs 120 and 130, selects and manages one uppermost pair, some upper pairs, or all pairs from the BS-MS beam pairs, and schedules a proper beam pair for the MSs 120 and 130 according to a condition.

A beam tracking process may be performed in each of the uplink and the downlink. In other words, one or more pairs of the BS Tx beams and the MS Rx beams may be selected in the downlink, and independently of the selection in the downlink, one or more pairs of the MS Tx beams and the BS Rx beams may be selected in the uplink.

Figure 2:
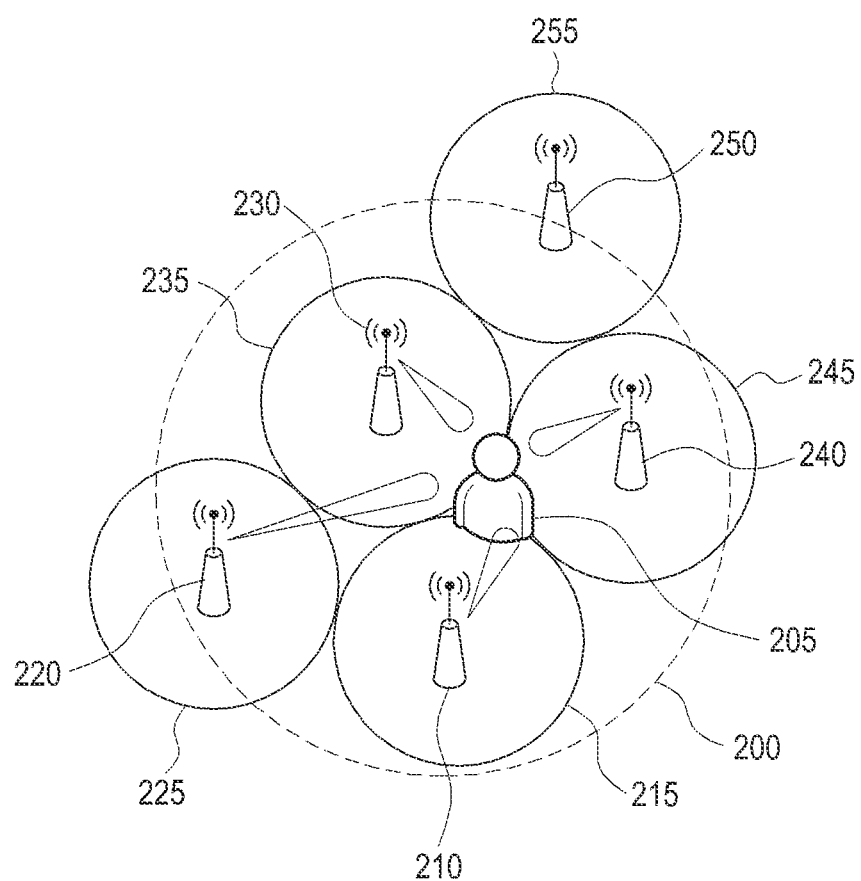
FIG. 2 illustrates an example of a type of cooperative communication between Base Stations (BSs) according to an embodiment of the present disclosure.

FIG. 2 illustrates an example of a type of cooperative communication between BSs according to an embodiment of the present disclosure.

Referring to FIG. 2, a plurality of BSs 210, 220, 230, and 240 controlling different cells 215, 225, 235, and 245 for communication of an MS 205 may cooperate with each other. In this case, a BS group 200 of the MS 205 includes the BSs 210, 220, 230, and 240 or cells 215, 225, 235, and 245. For the MS 205, the BSs 210, 220, 230, and 240 may cooperatively transmit data at the same time or selectively transmit data. Actual data transmission may be performed by one or more BSs. Uplink reception is also similarly made.

The BS group including the BSs (e.g., BSs 210, 220, 230, and 240 illustrated in FIG. 2) participating in the BS cooperative communication may be considered as one virtually expanded cell (e.g., a virtual cell). Because the virtual cell can remove a cell boundary effect, increasing data throughput of users located at cell boundary areas is possible. In addition, the virtual cell forms a link between a plurality of BSs and an MS, so that reliability of the link may be improved. Accordingly, selecting the virtual cell, for example, selecting members of the BS group for the BS cooperative communication, is very important to the cooperative communication.

For example, when the MS 205 has at least one stable communication link (Tx-Rx beam pair) with one BS (e.g., BS 240), the MS can operate in a single cell mode in which communication is performed only with the BS 240. However, when the communication link with the BS 240 is not stable, it may be preferable that the MS 205 operates in a BS cooperative communication mode. In this case, determining BSs which will participate in the BS cooperative communication is required.

In another example, when the MS 205 moves to be close to the cell 255 although the BS 250 controlling the cell 255 is not included in the BS group 200 of the MS 205 in the BS cooperative communication mode in which the MS 205 communicates with the BS group 200, the BS 250 should be added to the BS group 200 of the MS 205.

The MS reports a channel measurement result of one or more neighboring BSs including a serving BS to the serving BS periodically or in an event-driven scheme. The channel measurement result includes a signal measurement value of a reference signal output from each BS. As an example, the signal measurement value may include at least one of Reference Signal Received Power (RSRP), Reference Signal Received Quality (RSRQ), Carrier to Interference and Noise Ratio (CINR), and interference power. Further, each signal measurement value may become an average value of three or more Tx-Rx beam pairs having particular signal intensity or stronger, or a measurement value of a Tx-Rx beam pair having a strongest signal intensity. The signal measurement value described below may include various measurement parameters which have been or have not been mentioned in the above description unless there is a particular explanation.

Each BS may inform the MSs within the cell of whether the system or the corresponding BS supports the BS cooperative communication mode through a broadcasting channel. When the system including the BS always supports the BS cooperative communication mode, such a process may be omitted. Further, each BS may transmit reference parameters used for determining a member BS to enter the BS cooperative communication mode or to be added to the BS group to the MSs within the cell through a broadcasting channel.

In selecting the member BS to be included in the BS group of the MS, it is preferable to consider reliability of communication between the MS and the serving BS. When the reliability of the communication between the MS and the serving BS is guaranteed, the MS does not require many BSs for the BS cooperative communication or does not require using the BS cooperative communication. In contrast, when the reliability of the communication between the MS and the serving BS is not guaranteed, the MS requires more BSs for the BS cooperative communication.

The reliability of the communication may be determined by various known means. For example, when there are a plurality of communication links between the MS and the serving BS, for example, when there are Tx-Rx beam pairs in a system supporting the beamforming, the MS can be assured of reliable communication by the communication links. The MS or the serving BS may determine whether the communication is reliable by comparing the number of communication links based on the beamforming with a threshold. For example, the MS or the serving BS may determine whether the communication is reliable by comparing the number of beams available for the communication with a threshold.

According to various embodiments of the present disclosure, different thresholds may be used for determining BSs which will participate in the BS cooperative communication according to whether the reliability of the communication between the MS and the serving BS is guaranteed.

Figure 3:
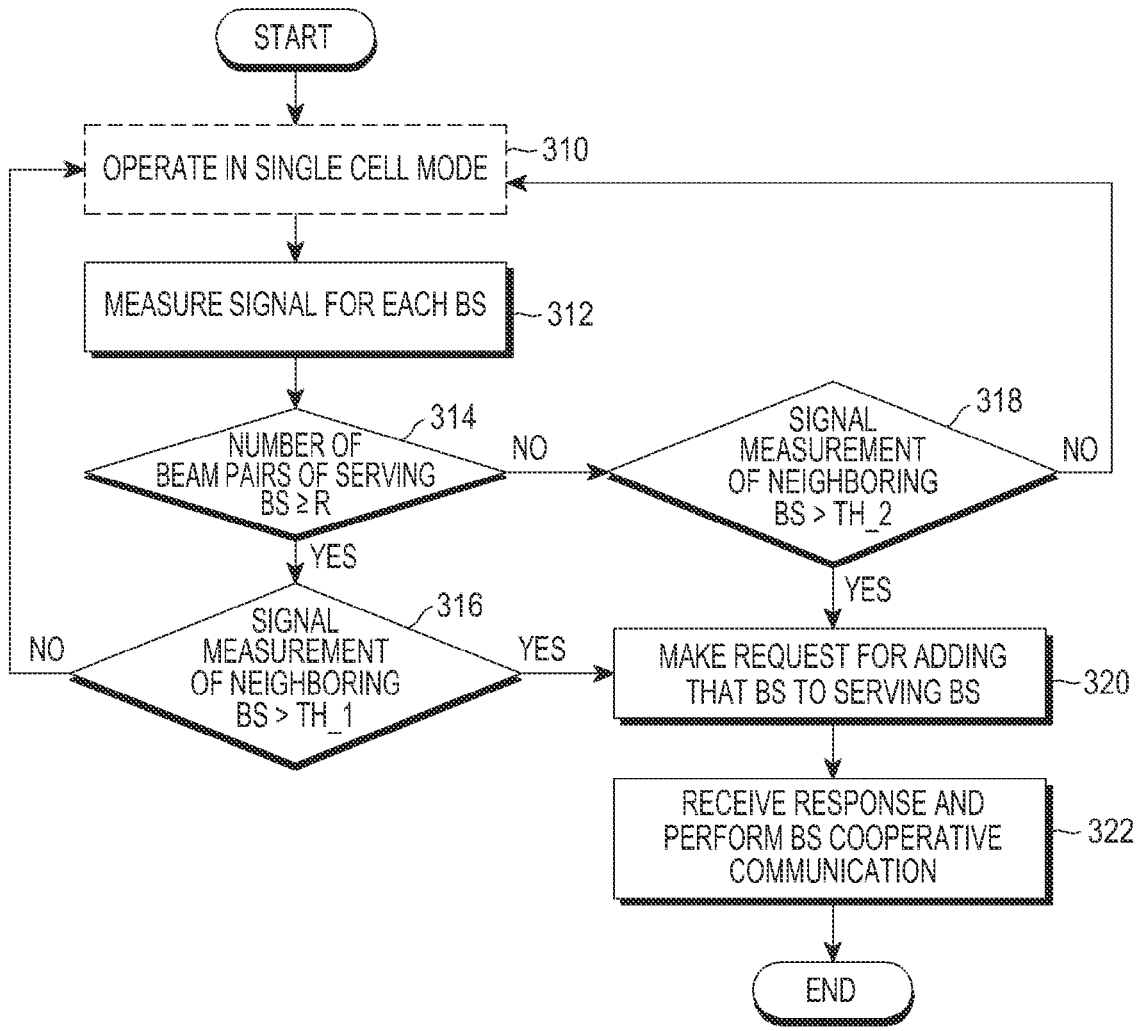
FIG. 3 is a flowchart illustrating a process in which a Mobile Station (MS) enters a BS cooperative communication mode according to an embodiment of the present disclosure.

FIG. 3 is a flowchart illustrating a process in which a Mobile Station (MS) enters a BS cooperative communication mode according to an embodiment of the present disclosure.

For example, FIG. 3 is a flowchart illustrating a process in which the MS switches from the single cell mode to the BS cooperative communication mode according to an embodiment of the present disclosure.

Referring to FIG. 3, at operation 310, the MS operates in a single cell mode. The MS may determine whether to enter the BS cooperative mode through operations 312 to 322 below while operating in the single cell mode at operation 310. According to various other embodiments of the present disclosure, the MS may determine whether a neighboring BS can additionally participate in the BS cooperative communication through the following steps while operating in the BS cooperative communication mode.

At operation 312, the MS performs channel measurements for neighboring BSs. For example, the MS may perform channel measurements for each BSs periodically or in an event-driven scheme. According to various embodiments of the present disclosure, the channel measurements for the neighboring BSs may be performed periodically or in the event-driven scheme. For example, when a signal measurement value of the serving BS is smaller than a threshold or the number of Tx-Rx beam pairs having a signal measurement value larger than a predetermined threshold is smaller than a predetermined reference value, the MS may perform the channel measurements for the neighboring BSs. In another example, when a frequency or rate in which a signal measurement value of the serving BS becomes smaller than a predetermined threshold for a predetermined time section is larger than a predetermined threshold, the MS may perform the channel measurements for the neighboring BSs.

Further, operations 314 to 322 described below for switching to the BS cooperative communication mode may be triggered by various events such as a predetermined cycle, a determination by the MS, and an instruction by the BS. According to various embodiments of the present disclosure, when a signal measurement value of the serving BS is smaller than a predetermined threshold or the number of Tx-Rx beam pairs having a signal measurement value larger than a predetermined threshold is smaller than a predetermined reference value, the MS performs operations 314 to 322. According to various embodiments of the present disclosure, when a rate in which a signal measurement value of the serving BS becomes smaller than a predetermined threshold for a predetermined time section is larger than a predetermined reference value, the MS performs operations 314 to 322.

At operation 314, the MS determines reliability of the communication link with the serving BS by comparing the number of Tx-Rx beam pairs available for the communication with the serving BS with a predetermined reference value R. For example, number of Tx-Rx beam pairs may be the number of downlink beams (pairs) or a sum of the number of uplink-downlink beam pairs. For example, the number of Tx-Rx beam pairs compared with the threshold may include Tx-Rx beam pairs selected through a predetermined process (e.g., beam tracking) to be used for the communication with the serving BS. In another example, the MS uses the number of Tx-Rx beam pairs having signal measurement values exceeding a predetermined threshold. According to various embodiments of the present disclosure, at operation 314, the MS compares the number of downlink (transmission) beams available for the communication with the serving BS with the reference value R. Thereafter, the MS proceeds to operations 316 or 318 according to a result of the comparison.

According to various embodiments of the present disclosure, at operation 314, when a frequency or rate in which a signal measurement value (e.g., RSRP) of the serving BS or an instantaneous signal size becomes smaller than a predetermined reference value for a predetermined time section is larger than a predetermined reference value, the MS may determine that stable communication with the serving BS is not possible.

According to various embodiments of the present disclosure, MS evaluates signal measurement values of neighboring BSs by using different thresholds TH_1 and TH_2 according to a result of the determination in operation 314. According to various embodiments of the present disclosure, TH_1 may be set to be larger than the threshold TH_2.

Specifically, when the MS determines that the number of Tx-Rx beam pairs is equal to or larger than R at operation 314, then the MS determines that the stable communication with the serving BS is possible and the MS proceeds to operation 316 at which the MS evaluates the signal measurement values of the neighboring BSs by using the relatively larger threshold TH_1. For example, TH_1 is set to be larger than the threshold TH_2 used in operation 318.

When the MS determines that at least one signal measurement value of the neighboring BS among the neighboring BSs is larger than TH_1 at operation 316, the MS proceeds to operation 320 at which the MS switches to the BS cooperative communication mode. At this time, a maximum number N_1 of BSs which can participate in the BS cooperative communication of the MS may be limited. Accordingly, at operation 316, the MS may involve the maximum number N_1 of neighboring BSs having high rank signal measurement values among the neighboring BSs in the BS cooperative communication.

In contrast, when the MS determines that signal measurement values of all neighboring BSs do not exceed TH_1 at operation 316, the MS returns to operation 310 at which the MS maintains the single cell mode until the next measurement or the next reliability determination. According to various embodiments of the present disclosure, when a signal measurement value of at least one neighboring BS is smaller than TH_1 and a signal measurement value of the serving BS is smaller than a predetermined threshold TH_3, the MS may proceed to operation 320.

In contrast, when the MS determines that the number of Tx-Rx beam pairs is smaller than R at operation 314, then the MS proceeds to operation 318 at which the MS determines that stable communication is not possible with the serving BS alone and evaluates signal measurement values of neighboring BSs by using the relatively smaller threshold TH_2. For example, when link reliability is low because the Tx-Rx beam pairs of the serving BS is small, the MS may increase the communication reliability by newly configuring a BS group even though a signal intensity of the neighboring BS is not relatively strong.

When the MS determines that at least one signal measurement value of the neighboring BS among the neighboring BSs is larger than TH_2 at operation 318, the MS proceeds to operation 320 at which the MS switches to the BS cooperative communication mode. Similarly, a maximum number N_2 of BSs which can participate in the BS cooperative communication of the MS may be limited. The maximum number of BSs included in the BS group of the MS may be differently determined in two cases as N_1 when the stable communication with the serving BS is possible and as N_2 when the stable communication with the serving BS is not possible, or may be determined independently. The MS may include the maximum number N_2 of neighboring BSs having high rank signal measurement values among the neighboring BSs in the BS group.

When the MS determines that signal measurement values of all neighboring BSs do not exceed TH_2 at operation 318, the MS returns to operation 310 at which the MS maintains the single cell mode until the next measurement or the next reliability determination. According to various embodiments of the present disclosure, when a signal measurement value of at least one neighboring BS is smaller than TH_2 and a signal measurement value of the serving BS is smaller than the predetermined threshold TH_3, the MS may proceed to operation 320.

At operation 320, the MS makes a request for including at least one neighboring BS in the BS group to the serving BS. For example, the MS makes a request for including at least one neighboring BS having the signal measurement value higher than TH_1 or TH_2 in the BS group to the serving BS. According to various embodiments of the present disclosure, the MS may insert at least one of an identifier and a signal measurement value of the corresponding neighboring BS into a request message.

At operation 322, the MS receives a response message instructing to configure the BS group from the serving BS and performs the BS cooperative communication through member BSs of the BS group. The serving BS may determine all or some of at least one neighboring BS requested by the MS as the member BS of the BS group and inform the MS of the finally determined member BSs of the BS group through the response message. Alternatively, the serving BS may reject the request by the MS and maintain the single cell mode until the next measurement or the next determination.

According to various embodiments of the present disclosure, the MS may determine a BS which will be newly added as a member of the BS group through operations 312 to 322 above while operating in the BS cooperative communication mode. According to such embodiments of the present disclosure, the MS may determine at least one neighboring BS having the signal measurement value higher than TH_1 or TH_2 according to operations 314, 316, and 318, and make a request for adding the determined neighboring BS as a new member of the BS group to the serving BS in operation 320. When there is no neighboring BS having the signal measurement value higher than TH_1 or TH_2, the MS determines not to add a new member to the BS group.

According to various embodiments of the present disclosure, in the determination of operation 314, the MS may use a total number of Tx-Rx beam pairs of the BSs included in the BS group. Specifically, when the total number of Tx-Rx beam pairs of the BSs included in the BS group is equal to or larger than R, a signal measurement value of each BS is compared with TH_1. In contrast, when the total number of Tx-Rx beam pairs of the BSs included in the BS group is smaller than R, the signal measurement value of each BS is compared with TH_2.

According to various embodiments of the present disclosure, in the determination of operation 314, the MS may use signal measurement values of the BSs included in the BS group or a sum of instantaneous signal sizes for a predetermined time section. Specifically, when an average of rates in which signal measurement values of the BSs included in the BS group become smaller than a predetermined threshold is larger than a predetermined threshold, the MS compares the signal measurement value of each neighboring BS with TH_1. Otherwise, TH_2 is used. According to various embodiments of the present disclosure, when a rate in which a sum of the instantaneous signal sizes of the BSs included in the BS group becomes smaller than a predetermined threshold is larger than a predetermined threshold, the MS compares the signal measurement value of each neighboring BS with TH_1. Otherwise, TH_2 is used.

According to various embodiments of the present disclosure, such as the embodiment of FIG. 3, the MS determines whether a condition of the BS cooperative communication mode is satisfied by using the number of Tx-Rx beam pairs and signal measurement values of the neighboring BSs. According to various embodiments of the present disclosure, the MS reports the number of Tx-Rx beam pairs and the signal measurement values of the neighboring BSs to the serving BS periodically or in the event-driven scheme, and the serving BS determines whether to operate the MS in the BS cooperative communication mode or to add a new member to the BS group of the MS based on the reported information.

According to various embodiments of the present disclosure, such as the embodiment of FIG. 3, each BS may transmit reference parameters, for example, R, TH_1, and TH_2 to MSs within the cell through a broadcasting channel.

According to various embodiments of the present disclosure, the serving BS may determine a neighboring BS which will participate in the BS cooperative communication for the MS by using a threshold according to reliability of the communication with the MS.

Figure 4:
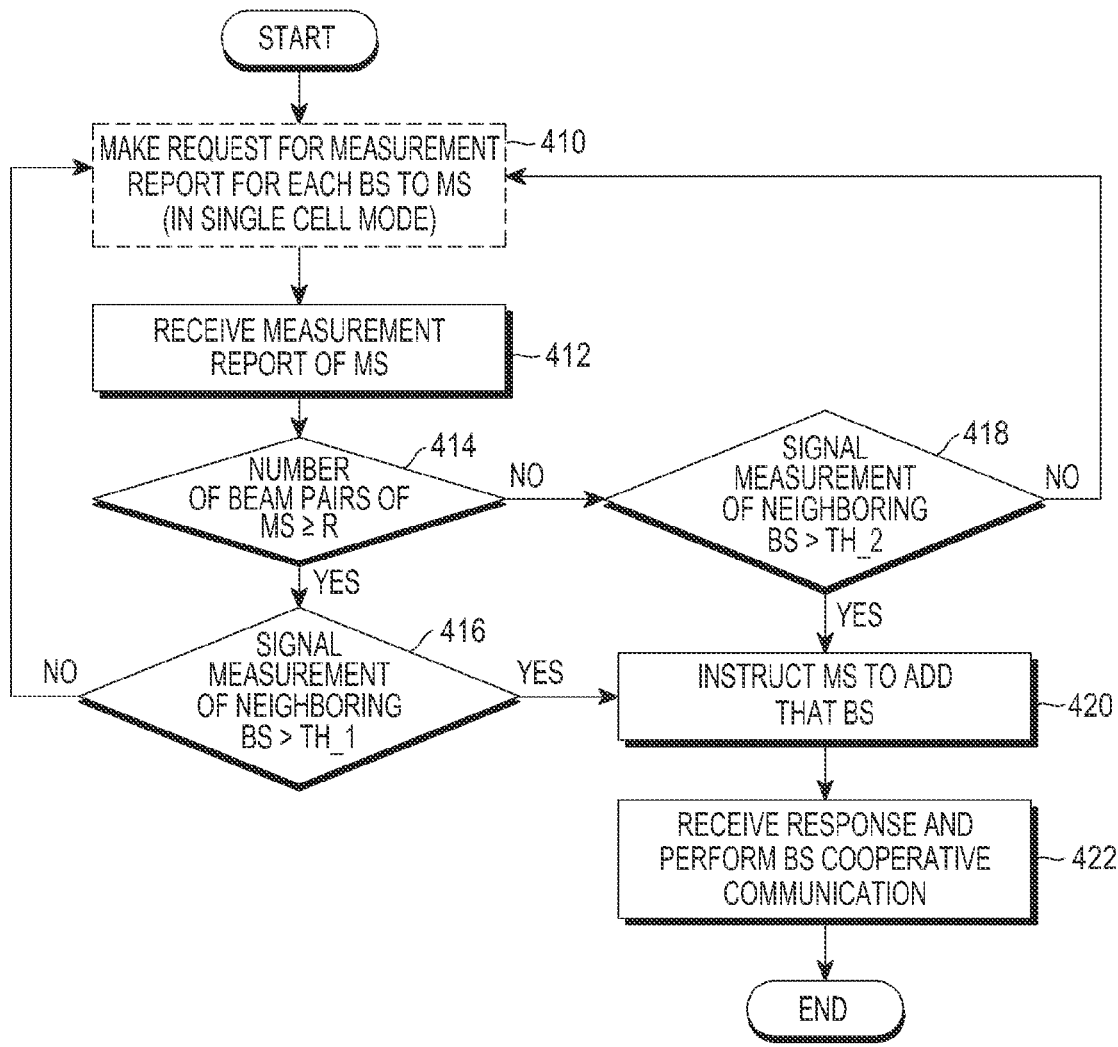
FIG. 4 is a flowchart illustrating a process in which a BS determines an entry of an MS into a BS cooperative communication mode according to an embodiment of the present disclosure.

FIG. 4 is a flowchart illustrating a process in which a BS determines an entry of an MS into a BS cooperative communication mode according to an embodiment of the present disclosure.

Referring to FIG. 4, at operation 410, the BS (e.g., the serving BS) makes a request for reporting signal measurement values of the neighboring BSs to the MS in the single cell mode (or BS cooperative communication mode). According to various embodiments of the present disclosure, when the MS periodically transmits a measurement report without a request by the BS, operation 410 may be omitted.

At operation 412, the BS receives a measurement report including the signal measurement values of the neighboring BSs from the MS. According to various embodiments of the present disclosure, the BS may receive a measurement report from the MS that includes measurement values of the BS itself (e.g., measurement values for the serving BS). According to various embodiments of the present disclosure, the measurement report may further include the number of Tx-Rx beam pairs having a signal measurement value exceeding a predetermined threshold among Tx-Rx beam pairs between the BS and the MS. According to various embodiments of the present disclosure, the BS may use the number of Tx-Rx beam pairs selected in the beam tracking process to be used for the communication with the MS.

At operation 414, the BS determines reliability of the communication link with the MS by comparing the number of Tx-Rx beam pairs available for the communication with the MS with the predetermined threshold R. For example, the number of Tx-Rx beam pairs compared with the threshold may include Tx-Rx beam pairs selected through a predetermined process (e.g., beam tracking) to be used for the communication with the MS. In another example, the BS uses the number of Tx-Rx beam pairs having signal measurement values exceeding a predetermined threshold. According to various embodiments of the present disclosure, at operation 414, the BS compares the number of downlink (transmission) beams available for the communication with the MS with the threshold R. Thereafter, the BS proceeds to operation 416 or 418 according to a result of the comparison.

The BS evaluates the signal measurement values of the neighboring BSs by using the different thresholds TH_1 and TH_2 according to a result of the determination of operation 414.

Specifically, when the BS determines that the number of Tx-Rx beam pairs is equal to or larger than R at operation 414, then the BS determines that the stable communication with the MS is possible and proceeds to operation 416 at which the BS evaluates the signal measurement values of the neighboring BSs by using the relatively larger threshold TH_1.

When the BS determines that at least one signal measurement value of the neighboring BS among the neighboring BSs is larger than TH_1 at operation 416, then the BS proceeds to operation 420 at which the BS switches the MS to the BS cooperative communication mode. At this time, the maximum number N_1 of BSs which can participate in the BS cooperative communication of the MS may be limited. Accordingly, the BS may determine to include the maximum number N_1 of neighboring BSs having the high rank signal measurement values among the neighboring BSs at operation 416 in the BS group for the MS.

In contrast, when the BS determines that signal measurement values of all neighboring BSs do not exceed TH_1 at operation 416, then the BS determines to maintain the MS in the single cell mode until the next report or the next reliability determination and returns to operation 410. According to various embodiments of the present disclosure, when a signal measurement value of at least one neighboring BS is smaller than TH_1 and a reported signal measurement value of the BS itself is smaller than the predetermined threshold TH_3, the BS may proceed to operation 420.

In contrast, when the BS determines that the number of Tx-Rx beam pairs is smaller than R at operation 414, then the BS determines that stable communication of the MS is not possible with the BS alone and proceeds to operation 418 at which the BS evaluates signal measurement values of the neighboring BSs reported by the MS by using the relatively smaller threshold TH_2.

When the BS determines that at least one signal measurement value of the neighboring BS among the neighboring BSs is larger than TH_2 at operation 418, the BS proceeds to operation 420 at which the BS switches the MS to the BS cooperative communication mode. Similarly, the maximum number N_2 of BSs which can participate in the BS cooperative communication of the MS may be limited. The maximum number of BSs included in the BS group of the MS may be differently determined in two cases as N_1 when the stable communication with the serving BS is possible and as N_2 when the stable communication with the serving BS is not possible, or may be determined independently. Accordingly, at operation 420, the BS may determine to include the maximum number N_2 of neighboring BSs having the high rank signal measurement values among the neighboring BSs at operation 418 in the BS group for the MS.

When the BS determines that signal measurement values of all neighboring BSs do not exceed TH_2 at operation 418, the BS returns to operation 410 at which the BS maintains the MS in the single cell mode until the next report or the next reliability determination. According to various embodiments of the present disclosure, when a signal measurement value of at least one neighboring BS is smaller than TH_2 and a reported signal measurement value of the BS itself is smaller than the predetermined threshold TH_3, the BS may proceed to operation 420.

At operation 420, the BS makes a request for including at least one neighboring BS having the signal measurement value higher than TH_1 or TH_2 in the BS group to the MS.

At operation 422, the BS receives a response message of the members of the BS group from the MS and performs the BS cooperative communication through the member BSs of the BS group. At this time, the serving BS may determine all or some of at least one BS having the signal measurement value higher than TH_1 or TH_2 as the member of BS group. Further, the BS may determine the member of the BS group by considering an additional parameter such as the BS's own system load as well as signal measurement values of the neighboring BSs.

According to various embodiments of the present disclosure, with respect to the MS operating in the BS cooperative communication mode, the BS may determine a new BS which will be participate in the BS cooperative communication of the MS through operations 412 to 422 above. In this case, the BS may determine at least one neighboring BS having the signal measurement value higher than TH_1 or TH_2 according to operations 414, 416, and 418 and instruct the MS to add the determined neighboring BS as a new member of the BS group at operation 420.

According to various embodiments of the present disclosure, in the determination of operation 414, the BS may use a total number of Tx-Rx beam pairs of the BSs included in the BS group of the MS. Specifically, when the total number of Tx-Rx beam pairs of the BSs included in the BS group of the MS is equal to or larger than R, a signal measurement value of each BS is compared with TH_1. In contrast, when the total number of Tx-Rx beam pairs of the BSs included in the BS group of the MS is smaller than R, the signal measurement value of each BS is compared with TH_2.

According to various embodiments of the present disclosure, in the determination of operation 414, the BS may use signal measurement values of the BSs included in the BS group or a sum of instantaneous signal sizes for a predetermined time section. Specifically, when an average of rates in which signal measurement values of the BSs included in the BS group of the MS become smaller than a predetermined threshold is larger than a predetermined threshold, the BS compares the signal measurement value of each neighboring BS with TH_1. Otherwise, TH_2 is used. According to various embodiments of the present disclosure, when a rate in which a sum of the instantaneous signal sizes of the BSs included in the BS group of the MS becomes smaller than a predetermined threshold is larger than a predetermined threshold, the BS compares the signal measurement value of each neighboring BS with TH_1. Otherwise, TH_2 is used.

According to various embodiments of the present disclosure, according to whether reliability of the communication between the MS and the serving BS is guaranteed, the MS or the BS may maintain the member BSs for the BS cooperative communication or determine to add a new BS.

Figure 5:
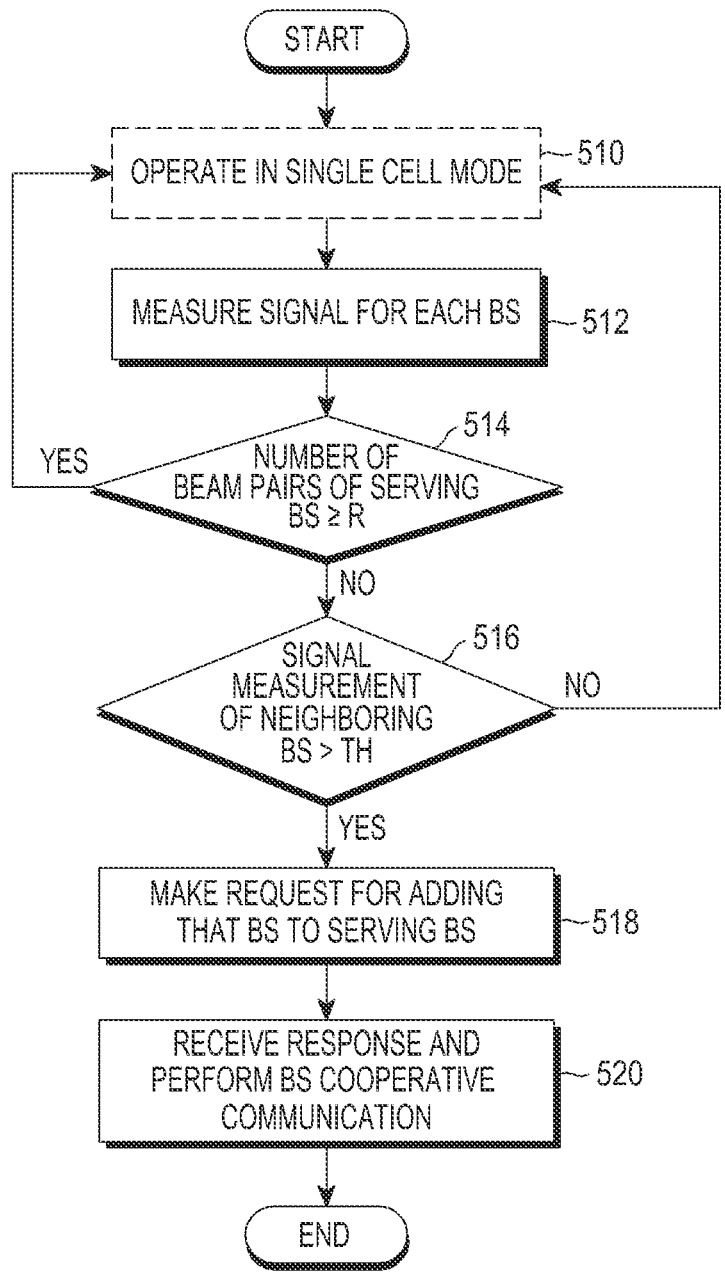
FIG. 5 is a flowchart illustrating a process in which an MS enters a BS cooperative communication mode according to an embodiment of the present disclosure.

FIG. 5 is a flowchart illustrating a process in which an MS enters a BS cooperative communication mode according to an embodiment of the present disclosure.

For example, FIG. 5 is a flowchart illustrating a process in which the MS switches from a single cell mode to a BS cooperative communication mode according to an embodiment of the present disclosure.

Referring to FIG. 5, at operation 510, the MS operates in the single cell mode. According to various embodiments of the present disclosure, the MS may determine whether to enter the BS cooperative mode through operations 510 to 520 below while operating in the single cell mode in operation 510. According to various embodiments of the present disclosure, the MS may determine a new BS which will participate in the BS cooperative communication through operations 512 to 520 below while operating in the BS cooperative communication mode.

At operation 512, the MS performs channel measurements for neighboring BSs periodically or in an event-driven scheme. According to various embodiments of the present disclosure, the channel measurements for the neighboring BSs may be performed periodically or in the event-driven scheme. Further, operations 514 to 520 below for switching to the BS cooperative communication mode may be triggered by various events such as a predetermined cycle, a determination by the MS, and an instruction by the BS.

At operation 514, the MS determines reliability of the communication link with the serving BS by comparing the number of Tx-Rx beam pairs available for the communication with the serving BS with a predetermined reference value R.

As a result of the determination of operation 514, when the communication link with the serving BS is reliable, the MS returns to operation 510. For example, when the MS determines that the number of Tx-Rx beam pairs is equal to or larger than R at operation 514, the MS determines to maintain an existing communication mode and returns to operation 510. According to various embodiments of the present disclosure, the MS determines to maintain existing members of the BS group.

In contrast, as a result of the determination of operation 514, when the communication link with the serving BS is not stable, the MS proceeds to operation 516. For example, when the number of Tx-Rx beam pairs is smaller than R at operation 514, the MS proceeds to operation 516 at which the MS evaluates signal measurement values of the neighboring BSs by using a predetermined threshold (e.g., TH_1 or TH_2).

When the MS determines that at least one signal measurement value of the neighboring BS among the neighboring BSs is larger than the threshold at operation 516, the MS proceeds to operation 518 at which the MS switches to the BS cooperative communication mode. In the BS cooperative communication mode, the MS may determine to include a maximum number N of neighboring BSs having high rank signal measurement values among the neighboring BSs in the BS group.

When signal measurement values of all neighboring BSs do not exceed the threshold at operation 516, the MS returns to operation 510 at which the MS maintains the existing communication mode until the next measurement or the next reliability determination.

At operation 518, the MS makes a request for including at least one BS having the signal measurement value higher than the threshold in the BS group to the serving BS.

At operation 520, the MS receives a response message indicating members of the BS group from the serving BS and performs the BS cooperative communication through the member BSs of the BS group.

According to various embodiments of the present disclosure, such as the embodiment of FIG. 5, each BS may transmit reference parameters, for example, R, TH_1, and TH_2 to MSs within the cell through a broadcasting channel.

Figure 6:
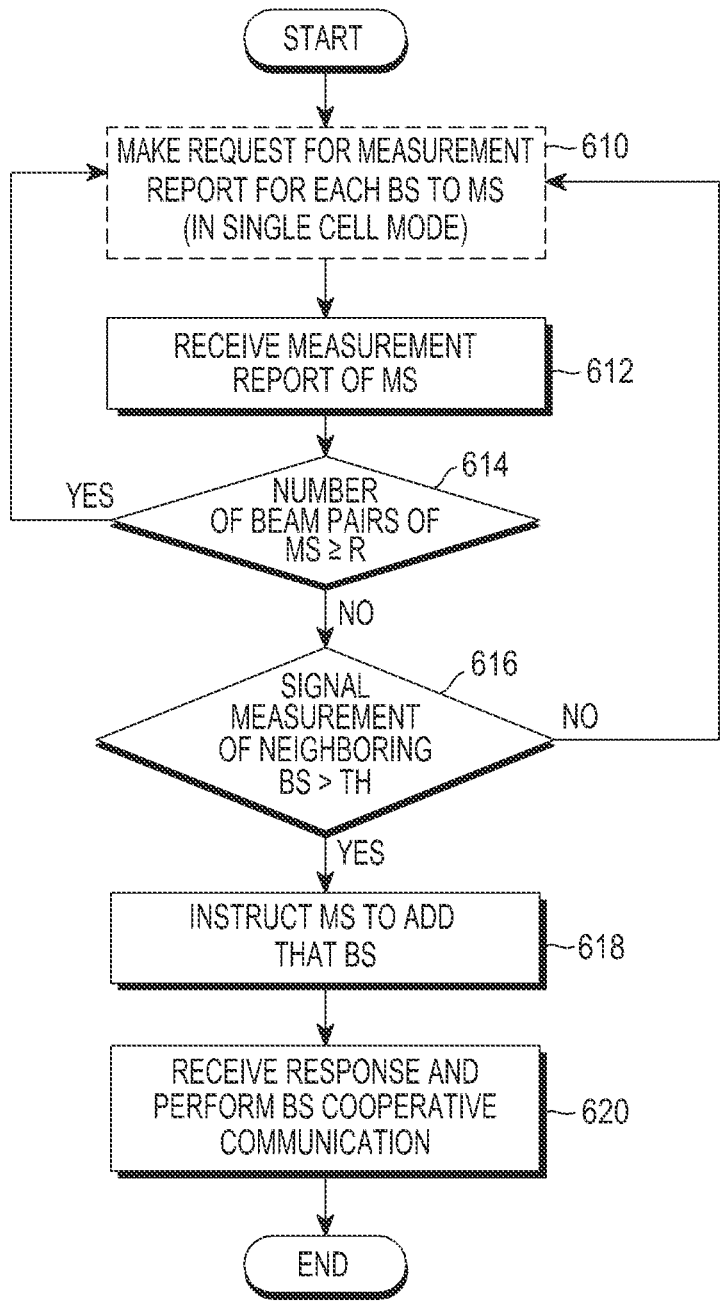
FIG. 6 is a flowchart illustrating a process in which a BS determines an entry of an MS into a BS cooperative communication mode according to an embodiment of the present disclosure.

FIG. 6 is a flowchart illustrating a process in which a BS determines an entry of an MS into a BS cooperative communication mode according to an embodiment of the present disclosure.

Referring to FIG. 6, at operation 610, the BS (e.g., the serving BS) makes a request for reporting signal measurement values of the neighboring BSs to the MS in the single cell mode (or BS cooperative communication mode). When the MS periodically transmits a measurement report without a request by the BS, operation 610 may be omitted.

At operation 612, the BS receives a measurement report including the signal measurement values of the neighboring BSs from the MS. According to various embodiments of the present disclosure, the BS may receive a measurement report including the measurement values for the BS itself (e.g., the serving BS) from the MS.

At operation 614, the BS determines reliability of the communication link with the MS by comparing the number of Tx-Rx beam pairs available for the communication with the MS with the predetermined threshold R.

As a result of the determination of operation 614, when the communication link with the MS is reliable, the BS returns to operation 610. For example, when the number of Tx-Rx beam pairs is equal to or larger than R at operation 614, the BS determines to maintain an existing communication mode and returns to operation 610 because the stable communication with the MS is possible. According to various embodiments of the present disclosure, the BS determines to maintain existing members of the BS group of the MS.

In contrast, as a result of the determination of operation 614, when the communication link with the serving BS is not stable, the BS proceeds to operation 616 at which the BS evaluates signal measurement values of the neighboring BSs reported by the MS by using a predetermined threshold. For example, when the number of Tx-Rx beam pairs is smaller than R at operation 614, the BS proceeds to operation 616 at which the BS evaluates signal measurement values of the neighboring BSs reported by the MS by using a predetermined threshold (e.g., TH_1 or TH_2).

When the BS determines that at least one signal measurement value of the neighboring BS among the neighboring BSs is larger than the threshold at operation 616, the BS proceeds to operation 618 at which the BS switches the MS to the BS cooperative communication mode. A maximum number of BSs which can participate in the BS cooperative communication of the MS may be limited.

At operation 618, the BS instructs the MS to include at least one BS having the signal measurement value higher than the threshold in the BS group to the MS.

At operation 620, the BS receives a response message about members of the BS group from the MS and performs the BS cooperative communication through the member BSs of the BS group.

According to various embodiments of the present disclosure, with respect to the MS operating in the BS cooperative communication mode, the BS may determine a new BS which will be added to the members of the BS group of the MS through operations 612 to 620 above. In this case, when stable communication with the MS is determined not to be possible, the BS may determine to add at least one neighboring BS as a new member of the BS group of the MS.

Figure 7:
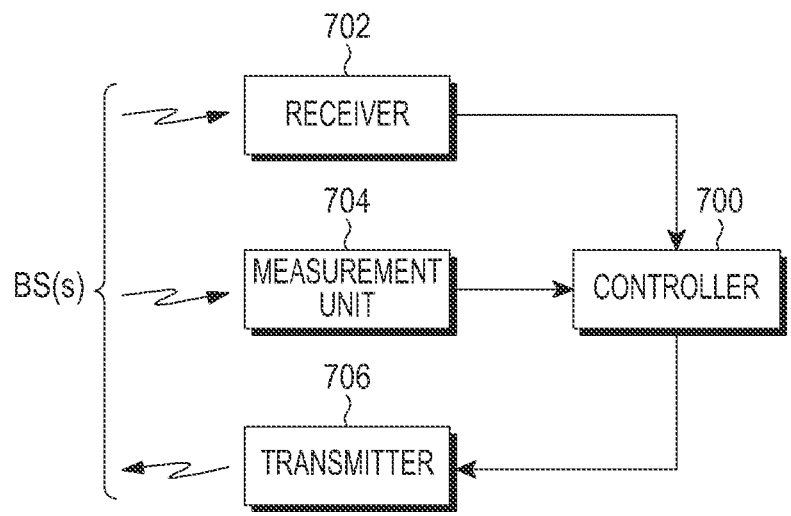
FIG. 7 is a block diagram illustrating a configuration of an MS according to an embodiment of the present disclosure.

FIG. 7 is a block diagram illustrating a configuration of an MS according to an embodiment of the present disclosure.

Referring to FIG. 7, a controller 700 of the MS may perform communication with at least one BS through a receiver 702 and a transmitter 706. A measurement unit 704 may be included in the receiver 702 or separately exist.

The measurement unit 704 measures a reference signal output from at least one BS, generates a signal measurement value, and provides the generated signal measurement value to the controller 700.

The controller 700 determines whether to switch the signal cell mode to the BS cooperative communication mode by using the number of beam pairs of the serving BS, signal measurement values of the neighboring BSs, and other parameters according to at least one of the aforementioned embodiments, or determine a BS which will participate in the BS cooperative communication mode. According to a result of the determination of the controller 700, the transmitter 706 transmits a request for the BS cooperative communication mode or a request for adding a new BS to the serving BS, receives a response to the request, and transmits the response to the controller 700. The controller 700 may generally control operations of the receiver 702, the transmitter 706, and the measurement unit 704.

Figure 8:
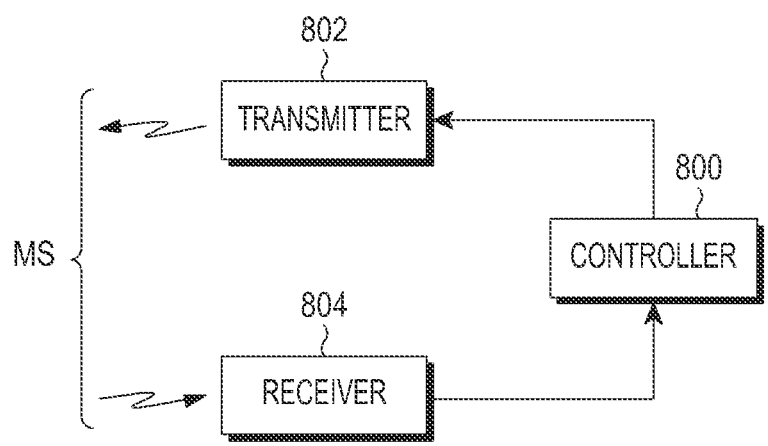
FIG. 8 is a block diagram illustrating a configuration of a BS according to an embodiment of the present disclosure.

FIG. 8 is a block diagram illustrating a configuration of a BS according to an embodiment of the present disclosure.

Referring to FIG. 8, the BS may include a controller 800, a transmitter 802, and a receiver 804.

The controller 800 of the BS may perform communication with at least one MS within the cell through the transmitter 802 and the receiver 804. Although not illustrated, according to various embodiments of the present disclosure, the controller 800 may be connected to another BS within the system through a backbone network to perform the BS cooperative communication. The controller 800 determines whether to switch the signal cell mode to the BS cooperative communication mode by using the number of beam pairs related to the MS, signal measurement values of the neighboring BSs, and other parameters according to at least one of the aforementioned embodiments, or determine a BS which will be added to the BS group used in the BS cooperative communication mode. According to a result of the determination of the controller 800, the transmitter 804 transmits an instruction of the BS cooperative communication mode or an instruction of adding a new BS to the MS, receives a response to the instruction, and transmits the response to the controller 800. The controller 800 may generally control operations of the receiver 802 and the transmitter 804.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown described with reference to various embodiments thereof, it will be understood by those skilled in the art that various changes in form and details may be made without departing from the spirit and scope of the present disclosure as defined by the appended claims and their equivalents.

What is claimed is:

1. A method for base station (BS) cooperative communication in a wireless communication system supporting downlink beam forming, the method comprising:
measuring signal qualities for a serving BS and one or more neighboring BSs;
determining, by a mobile station (MS), a number of beams available for communication between the serving BS and the MS;
determining, by the MS, at least one neighboring BS to be joined in the BS cooperative communication for the MS from among one or more neighboring BSs based on the number of beams available;
transmitting, by the MS, a request for switching a single cell mode to a BS cooperative communication mode to the serving BS, if the number of beams available is smaller than a first value and at least one neighboring BS has a signal measurement larger than a first threshold while the MS operates in the single cell mode; and performing the BS cooperative communication, in response to receiving a response from the serving BS granting the request for switching the single cell mode to the BS cooperative communication mode.

2. The method of claim 1, further comprising:

if the number of beams available is equal to or larger than the first value, comparing signal measurements of the one or more neighboring BSs with a second threshold larger than the first threshold; and determining to involve at least one neighboring BS having a signal measurement larger than the second threshold in the BS cooperative communication.

3. The method of claim 2, further comprising:

if one or more neighboring BSs having a signal measurement larger than the first threshold or the second threshold do not exist, determining not to involve the one or more neighboring BSs in the BS cooperative communication.

4. The method of claim 2, further comprising:

requesting for adding one or more neighboring BSs having a signal measurement larger than the first threshold or the second threshold as a member of a BS group for the BS cooperative communication to the serving BS.

5. The method of claim 1, further comprising:

if a signal measurement of the serving BS is smaller than a second threshold, the number of beams available is smaller than a third threshold, or a frequency in which the signal measurement of the serving BS becomes smaller than a predetermined value is larger than a fourth threshold, determining whether to involve at least one neighboring BS in the BS cooperative communication for the MS based on signal measurements of the one or more neighbor BSs.

6. The method of claim 1, further comprising:

comparing the signal measurements of the one or more neighboring BSs with the first threshold if a frequency in which a signal measurement or an instant signal strength of the serving BS becomes smaller than a predetermined value is not smaller than a second value;

determining, if one or more neighboring BSs having a signal measurement larger than the first threshold do not exist, not to involve the one or more neighboring BSs in the BS cooperative communication; and determining to involve at least one neighboring BS having the signal measurement larger than the first threshold in the BS cooperative communication for the MS.

7. The method of claim 1, further comprising at least one of:

determining, if a number of beams available for communication between BSs participating in the BS cooperative communication of the MS and the MS is smaller than a predetermined value, whether the one or more neighboring BSs is capable of participating in the BS cooperative communication for the MS;

determining, if an average of frequencies in which signal measurement of the BSs participating in the BS cooperative communication of the MS become smaller than a first threshold reference value for a time period is larger than a second threshold reference value, whether the one or more neighboring BSs is capable of participating in the BS cooperative communication for the MS; and determining, if a frequency in which a sum of instantaneous signal sizes of the BSs participating in the BS cooperative communication of the MS becomes smaller than a third threshold reference value is larger than a fourth threshold reference value, whether the one or more neighboring BSs is capable of participating in the BS cooperative communication for the MS.

8. A method for base station (BS) cooperative communication in a wireless communication system supporting downlink beam forming, the method comprising:

receiving, by a serving BS, a measurement report indicating signal measurements of the serving BS and one or more neighboring BSs from a mobile station (MS);

determining, by the serving BS, a number of beams available for communication between the serving BS and the MS;

determining, by the serving BS, at least one neighboring BS to be joined in the BS cooperative communication for the MS based on the number of beams available;

instructing the MS to switch a single cell mode to a BS cooperative communication mode, if the number of beams available is smaller than a first value and at least one neighboring BS has a signal measurement larger than a first threshold while the MS operates in the single cell mode; and performing the BS cooperative communication.

9. The method of claim 8, further comprising:

if the number of beams available is equal to or larger than the the first value, comparing signal measurements of the one or more neighboring BSs with a second threshold larger than the first threshold; and determining to involve at least one neighboring BS having a signal measurement larger than the second threshold in the BS cooperative communication.

10. The method of claim 9, further comprising:

if one or more neighboring BSs having a signal measurement larger than the first threshold or the second threshold do not exist, determining not to involve the one or more neighboring BSs in the BS cooperative communication.

11. The method of claim 9, further comprising:

instructing the MS to add one or more neighboring BSs having a signal measurement larger than the second threshold or a third threshold as a member of a BS group for the BS cooperative communication to the serving BS.

12. The method of claim 8, further comprising:

comparing the signal measurement of the one or more neighboring BSs with the first threshold if a frequency in which a signal measurement or an instant signal strength of the serving BS becomes smaller than a predetermined value is not smaller than a second value;

determining, if one or more neighboring BSs having a signal measurement larger than the first threshold do not exist, not to involve the one or more neighboring BSs in the BS cooperative communication; and determining to involve at least one neighboring BS having the signal measurement larger than the first threshold in the BS cooperative communication for the MS.

13. The method of claim 9, further comprising at least one of:

determining, if a number of beams available for communication between BSs participating in the BS cooperative communication of the MS and the MS is smaller than a predetermined value, whether the one or more neighboring BSs is capable of participating in the BS cooperative communication for the MS;

determining, if an average of frequencies in which signal measurement of the BSs participating in the BS cooperative communication of the MS become smaller than a first threshold reference value for a time period is larger than a second threshold reference value, whether the one or more neighboring BSs is capable of participating in the BS cooperative communication for the MS; and determining, if a frequency in which a sum of instantaneous signal sizes of the BSs participating in the BS cooperative communication of the MS becomes smaller than a third threshold reference value is larger than a fourth threshold reference value, whether the one or more neighboring BSs is capable of participating in the BS cooperative communication for the MS.

14. An apparatus of a mobile station (MS) for performing base station (BS) cooperative communication in a wireless communication system, the apparatus comprising:
a transceiver configured to transmit and receive signals;
a processor; and
a memory storing one or more computer programs configured to be executed by the processor, the one or more computer programs including instructions to:
measure signal qualities of a serving BS and one or more neighboring BSs,
determine a number of beams available for communication between the serving BS and the MS,
determine at least one neighboring BS to be joined in the BS cooperative communication for the MS based on the nunber of beams available,
request for switching a single cell mode to a BS cooperative communication mode to the serving BS, if the number of beams available is smaller than a first value and at least one neighboring BS has a signal measurement larger than a first threshold while the MS operates in the single cell mode, and
perform the BS cooperative communication, in response to receiving a response from the serving BS granting the request for switching the single cell mode to the BS cooperative communication mode.

15. The apparatus of claim 14, wherein, if the number of beams available is equal to or larger than the first value, the processor is further configured to:
compare signal measurements of the one or more neighboring BSs with a second threshold larger than the first threshold, and
determine to involve at least one neighboring BS having a signal measurement larger than the second threshold in the BS cooperative communication.

16. The apparatus of claim 15, wherein, if one or more neighboring BSs having a signal measurement larger than the first threshold or the second threshold do not exist, the processor is further configured to determine not to involve the one or more neighboring BSs in the BS cooperative communication.

17. The apparatus of claim 15, wherein the transceiver is further configured to transmit a request for adding one or more neighboring BSs having a signal measurement larger than the first threshold or the second threshold as a member of a BS group for the BS cooperative communication to the serving BS.

18. The apparatus of claim 16, wherein, if a signal measurement of the serving BS is smaller than a second threshold, the number of beams available is smaller than a third threshold, or a frequency in which the signal measurement of the serving BS becomes smaller than a predetermined value is larger than a fourth threshold, the processor is further configured to determine whether to involve at least one neighboring BS in the BS cooperative communication for the MS based on signal measurements of the one or more neighbor BSs.

19. The apparatus of claim 14, wherein the processor is further configured to:
compare the signal measurement of the one or more neighboring BSs with the first threshold if a frequency in which a signal measurement or an instant signal strength of the serving BS becomes smaller than a predetermined value is not smaller than a second value,
determine, if one or more neighboring BSs having a signal measurement larger than the first threshold do not exist, not to involve the one or more neighboring BSs in the BS cooperative communication, and
determine to involve at least one neighboring BS having the signal measurement larger than the first threshold in the BS cooperative communication for the MS.

20. The apparatus of claim 14, wherein the processor is further configured to perform at least one of:
an operation of determining, if a number of beams available for communication between BSs participating in the BS cooperative communication of the MS and the MS is smaller than a predetermined value, whether the one or more neighboring BSs is capable of participating in the BS cooperative communication for the MS,
an operation of determining, if an average of frequencies in which signal measurement of the BSs participating in the BS cooperative communication of the MS become smaller than a first threshold reference value for a time period is larger than a second threshold reference value, whether the one or more neighboring BSs is capable of participating in the BS cooperative communication for the MS, and
an operation of determining, if a frequency in which a sum of instantaneous signal sizes of the BSs participating in the BS cooperative communication of the MS becomes smaller than a third threshold reference value is larger than a fourth threshold reference value, whether the one or more neighboring BSs is capable of participating in the BS cooperative communication for the MS.

21. A base station (BS) apparatus performing BS cooperative communication in a wireless communication system supporting downlink beam forming, the BS apparatus comprising:
a transceiver configured to receive a measurement report indicating signal measurements of a serving BS and one or more neighboring BSs from a mobile station (MS); and
a processor configured to:
determine a number of beams available for communication between the serving BS and the MS,
determine at least one neighboring BS to be joined in the BS cooperative communication for the MS based on the number of beam avaialble,
instruct the MS to switch a single cell mode to a BS cooperative communication mode, if the number of beams available is smaller than a first value and at least one neighboring BS has a signal measurement larger than a first threshold while the MS operates in the single cell mode, and
perform the BS cooperative communication.

22. The apparatus of claim 21, wherein, if the number of beams available is equal to or larger than the first value, the processor is further configured to:

compare signal measurements of the one or more neighboring BSs with a second threshold larger than the first threshold, and determine to involve at least one neighboring BS having a signal measurement larger than the second threshold in the BS cooperative communication.

23. The apparatus of claim 22, wherein, if one or more neighboring BSs having a signal measurement larger than the first threshold or the second threshold do not exist, the processor is further configured to determine not to involve the one or more neighboring BSs in the BS cooperative communication.

24. The apparatus of claim 22, wherein the transceiver is further configured to instruct the MS to add one or more neighboring BSs having a signal measurement larger than the second threshold or a third threshold as the member of the BS group for the BS cooperative communication.

25. The apparatus of claim 22, wherein the processor is further configured to:

compare the signal measurement of the one or more neighboring BSs with the first threshold if a frequency in which a signal measurement or an instant signal strength of the serving BS becomes smaller than a predetermined value is not smaller than a second value, determine, if one or more neighboring BSs having a signal measurement larger than the first threshold do not exist, not to involve the one or more neighboring BSs in the BS cooperative communication, and determine to involve at least one neighboring BS having the signal measurement larger than the first threshold in the BS cooperative communication for the MS.

26. The apparatus of claim 22, wherein the processor is further configured to perform at least one of:

an operation of determining, if a number of beams available for communication between BSs participating in the BS cooperative communication of the MS and the MS is smaller than a predetermined value, whether the one or more neighboring BSs is capable of participating in the BS cooperative communication for the MS, an operation of determining, if an average of frequencies in which signal measurement of the BSs participating in the BS cooperative communication of the MS become smaller than a first threshold reference value for a time period is larger than a second threshold reference value, whether the one or more neighboring BSs is capable of participating in the BS cooperative communication for the MS, and an operation of determining, if a frequency in which a sum of instantaneous signal sizes of the BSs participating in the BS cooperative communication of the MS becomes smaller than a third threshold reference value is larger than a fourth threshold reference value, whether the one or more neighboring BSs is capable of participating in the BS cooperative communication for the MS.

27. The method of claim 1, wherein the evaluating of the reliability of the communication link comprises:

determining that a BS is not required to be joined in BS cooperative communication for the MS if the number of beams available is equal to or larger than a first value.

28. The method of claim 8, wherein the evaluating of the reliability of the communication link comprises:

determining that a BS is not required to be joined in the BS cooperative communication for the MS if the number of beams available is equal or larger than a first value.

29. The apparatus of claim 14, wherein the processor is further configured to:

determine that a BS is not required to be joined in BS cooperative communication for the MS if the number of beams available is equal to or larger than a first value.

30. The apparatus of claim 21, wherein the processor is further configured to:

determine that a BS is not required to be joined in the BS cooperative communication for the MS if the number of available beams is equal or larger than a value.

* * * * *